United States Patent
Tachioka et al.

(10) Patent No.: US 9,336,770 B2
(45) Date of Patent: May 10, 2016

(54) PATTERN RECOGNITION APPARATUS FOR CREATING MULTIPLE SYSTEMS AND COMBINING THE MULTIPLE SYSTEMS TO IMPROVE RECOGNITION PERFORMANCE AND PATTERN RECOGNITION METHOD

(71) Applicants: MITSUBISHI ELECTRIC CORPORATION, Chiyoda-ku (JP); MITSUBISHI ELECTRIC RESEARCH LABORATORIES, INC., Cambridge, MA (US)

(72) Inventors: Yuki Tachioka, Chiyoda-ku (JP); Shinji Watanabe, Arlington, MA (US)

(73) Assignees: MITSUBISHI ELECTRIC CORPORATION, Chiyoda-ku (JP); MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 245 days.

(21) Appl. No.: 13/965,726

(22) Filed: Aug. 13, 2013

(65) Prior Publication Data

US 2015/0051909 A1    Feb. 19, 2015

(51) Int. Cl.
*G10L 15/00* (2013.01)
*G10L 15/06* (2013.01)

(52) U.S. Cl.
CPC .............. *G10L 15/06* (2013.01); *G10L 15/063* (2013.01); *G10L 2015/0635* (2013.01)

(58) Field of Classification Search
CPC ........................ G10L 15/063; G10L 15/0653
USPC ................................................. 704/243–244
See application file for complete search history.

(56) References Cited

U.S. PATENT DOCUMENTS

| | | | |
|---|---|---|---|
| 7,680,659 B2 * | 3/2010 | Gao et al. ...................... 704/236 |
| 8,583,432 B1 * | 11/2013 | Biadsy .................. G10L 15/063 704/10 |
| 2004/0231498 A1 * | 11/2004 | Li et al. ........................... 84/634 |
| 2006/0287856 A1 * | 12/2006 | He ........................ G10L 15/063 704/256 |
| 2008/0033720 A1 * | 2/2008 | Kankar et al. ................ 704/235 |
| 2008/0091424 A1 * | 4/2008 | He et al. ....................... 704/240 |

(Continued)

FOREIGN PATENT DOCUMENTS

| | | |
|---|---|---|
| JP | 2010-152751 | 7/2010 |
| JP | 2010-164780 | 7/2010 |

(Continued)

OTHER PUBLICATIONS

International Search Report issued Sep. 9, 2014 in corresponding PCT/JP2013/085346 filed on Dec. 27, 2013.

(Continued)

*Primary Examiner* — Shaun Roberts
(74) *Attorney, Agent, or Firm* — Oblon, McClelland, Maier & Neustadt, L.L.P.

(57) ABSTRACT

Provided is a pattern recognition apparatus for creating multiple systems and combining the multiple systems to improve the recognition performance, including a discriminative training unit for constructing model parameters of a second or subsequent system based on an output tendency of a previously-constructed model so as to be different from the output tendency of the previously-constructed model. Accordingly, when multiple systems are combined, the recognition performance can be improved without trials-and-errors.

12 Claims, 11 Drawing Sheets

(56) References Cited

U.S. PATENT DOCUMENTS

| | | | | |
|---|---|---|---|---|
| 2008/0177547 | A1* | 7/2008 | Yaman et al. | 704/257 |
| 2009/0138265 | A1* | 5/2009 | Willett | G10L 15/30 704/251 |
| 2009/0248394 | A1* | 10/2009 | Sarikaya et al. | 704/4 |
| 2011/0144991 | A1* | 6/2011 | Fousek et al. | 704/243 |
| 2012/0330664 | A1* | 12/2012 | Lei et al. | 704/256.1 |
| 2013/0185070 | A1* | 7/2013 | Huo et al. | 704/243 |

FOREIGN PATENT DOCUMENTS

| | | |
|---|---|---|
| JP | 2010-204175 | 9/2010 |
| JP | 2012-108429 | 6/2012 |

OTHER PUBLICATIONS

Ryuki Tachibana, et al., "Frame-level AnyBoost for LVCSR with the MMI Criterion", Automatic Speech Recognition and Understanding, ASRU 2011, XP-002728947, pp. 12-17.

Carsten Meyer, et al., "Boosting HMM acoustic models in large vocabulary speech recognition", Speech Communication, vol. 48, No. 5, 2006, XP027926238, pp. 532-548.

Gonzalo Martínez-Muñoz, et al., "U sing boosting to prune bagging ensembles", Pattern Recognition Letters, vol. 28, No. 1, 2007, XP005838624, pp. 156-165.

George Saon, et al., "Boosting systems for large vocabulary continuous speech recognition", XP 55135854, Speech Communication, vol. 54, No. 2, Feb. 2012, pp. 212-218.

Haihua Xu, et al., "An efficient multistage rover method for automatic speech Recognition", Multimedia and EXPO, ICME 2009, XP31510895, Jun. 2009.

Jun Du, et al., "Boosted Mixture Learning of Gaussian Mixture Hidden Markov Models Based on Maximum Likelihood for Speech Recognition", IEEE Transactions on Audio, Speech, and Language Processing, vol. 19, No. 7, Sep. 2011, XP11335557, pp. 2091-2100.

Jie Zhang, "Sequential Training of Bootstrap Aggregated Neural Networks for Nonlinear Systems Modelling", Proceedings of the 2002 American Control Conference Anchorage, vol. 1, No. 8, May 2002, XP10597164, pp. 531-536.

Daniel Pavey, et al., "Boosted mmi for model and feature-space discriminative training", Acoustics, Speech and Signal Processing, ICASSP2008, Mar. 2008, XP31251487, pp. 4057-4060.

S. Charles Brubaker, et al., "Towards the Optimal Training of Cascades of Boosted Ensembles", Toward Category-Level Object Recognition, LNCS 4170, 2006, XP019053224, pp. 301-320.

Lior Rokach, "Ensemble-based classifiers", Artificial Intelligence Review, 2010, vol. 33, No. 1-2, XP19766150, pp. 1-39.

Brian Roark, et al., "Discriminative Language Modeling with Conditional Random Fields and the Perceptron Algorithm", Proc. ACL, 2004, 8 pages.

Daniel Povey, et al., "FMPE: Discriminatively Trained Features for Speech Recognition", Proc. ICASSP, 2005, 4 pages.

* cited by examiner

PATTERN RECOGNITION APPARATUS FOR CREATING MULTIPLE SYSTEMS AND COMBINING THE MULTIPLE SYSTEMS TO IMPROVE RECOGNITION PERFORMANCE AND PATTERN RECOGNITION METHOD

BACKGROUND OF THE INVENTION

1. Field of the Invention

The present invention relates to a pattern recognition apparatus and a pattern recognition method for speech recognition and character recognition, for example.

2. Description of the Related Art

Hereinafter, description is made using speech recognition as an example, but the description also relates to the other types of recognition. In the last 10 years, performance of speech recognition has significantly improved. One of the biggest factors is that the method of training an acoustic model has shifted from maximum likelihood (ML) to discriminative training. This approach aims at improving the performance by referring to correct labels with a single system.

In contrast, approaches based on system integration (for example, recognizer output voting error reduction: ROVER) aim at improving the performance by using multiple systems. To be specific, the approaches can obtain a better hypothesis among hypotheses of a base system and complementary systems based on a majority rule. As a result, even if performance of the complementary systems is lower than that of the base system, higher performance can be obtained than in the case where only the base system is used.

Meanwhile, there has been known a technology in which, when there are multiple models, for the purpose of reinforcing a certain specific model, training data to be used to train the model is efficiently selected (see, for example, Japanese Patent Application Laid-open No. 2012-108429). This technology is related to the present invention in that an utterance having a low recognition rate is selected by using recognition results for the multiple models including the specific model and the specific model is updated and trained by using the selected utterances with the corresponding correct labels. However, this technology is focused on selecting the training data and is also different in configuration of the training system.

There has also been known a technology in which weights for speech feature statistics of correct labels and speech feature statistics of error hypotheses are determined. These weights are used to compensate the speech feature statistics of correct labels and error hypothesis, which can be used to compute additional speech feature statistics for each discriminative criterion (e.g., minimum classification error, maximum mutual information, or minimum phone error), to thereby update an acoustic model (see, for example, Japanese Patent Application Laid-open No. 2010-164780). This technology is partially related to the present invention in that the single acoustic model is updated, but provides no description on the multiple models.

There has also been known a technology in which multiple models are constructed to be optimized for each environment (see, for example, Japanese Patent Application Laid-open No. 2010-204175). As opposed to the present invention, this technology does not construct a combination of systems so as to improve performance, and is also different in configuration of the training system.

Further, there has been known a technology in which a statistic model is constructed for every N training data set and a statistic model that gives the highest recognition rate is selected (see, for example, Japanese Patent Application Laid-open No. 2010-152751). As opposed to the present invention, this technology does not construct multiple systems simultaneously.

In system integration, it is efficient to integrate hypotheses having different tendencies, and in order to construct a complementary system having a different output tendency, different features and model training methods are used. However, when the hypothesis of the complementary system exhibits a tendency similar to that of a base system or includes too many errors, the system integration does not always improve performance.

In order to address this problem, conventionally, it has often been the case that a number of systems are created and several best combinations of the multiple system outputs are determined in terms of the performance of a development set. With such trial-and-error attempts, the systems are overtuned to a specific task and robustness against unknown data is reduced. Therefore, it is desired that the complementary system be constructed based on some theoretical training criteria.

SUMMARY OF THE INVENTION

The present invention has been made to solve the above-mentioned problem, and therefore has an object to provide a pattern recognition apparatus and a pattern recognition method capable of improving recognition performance when multiple systems are combined.

According to one embodiment of the present invention, there is provided a pattern recognition apparatus for creating multiple systems and combining the multiple systems to improve recognition performance, including a discriminative training unit for constructing a second or subsequent system where the model parameters are trained so as to output a different tendency from the output tendency of the previously-constructed model.

Further, according to one embodiment of the present invention, there is provided a pattern recognition method to be used in a pattern recognition apparatus for creating multiple systems and combining the multiple systems to improve recognition performance, the pattern recognition method including a discriminative training step for constructing a second or subsequent system, where the model parameters are trained so as to output a different tendency from the output tendency of the previously-constructed model.

The pattern recognition apparatus and the pattern recognition method according to the embodiments of the present invention, create multiple systems and combine the multiple systems to improve recognition performance, and include the discriminative training unit (step) for constructing a second or subsequent system, where the model parameters are trained so as to output a different tendency from the output tendency of the previously-constructed model.

As a result, recognition performance can be improved when the multiple systems are combined.

DETAILED DESCRIPTION OF THE PREFERRED EMBODIMENTS

Now, a pattern recognition apparatus and a pattern recognition method according to exemplary embodiments of the present invention are described with reference to the drawings, in which the same or corresponding parts are denoted by the same reference symbols for description.

First Embodiment

Construction method of a complementary system based on discriminative criteria

Figure 1:
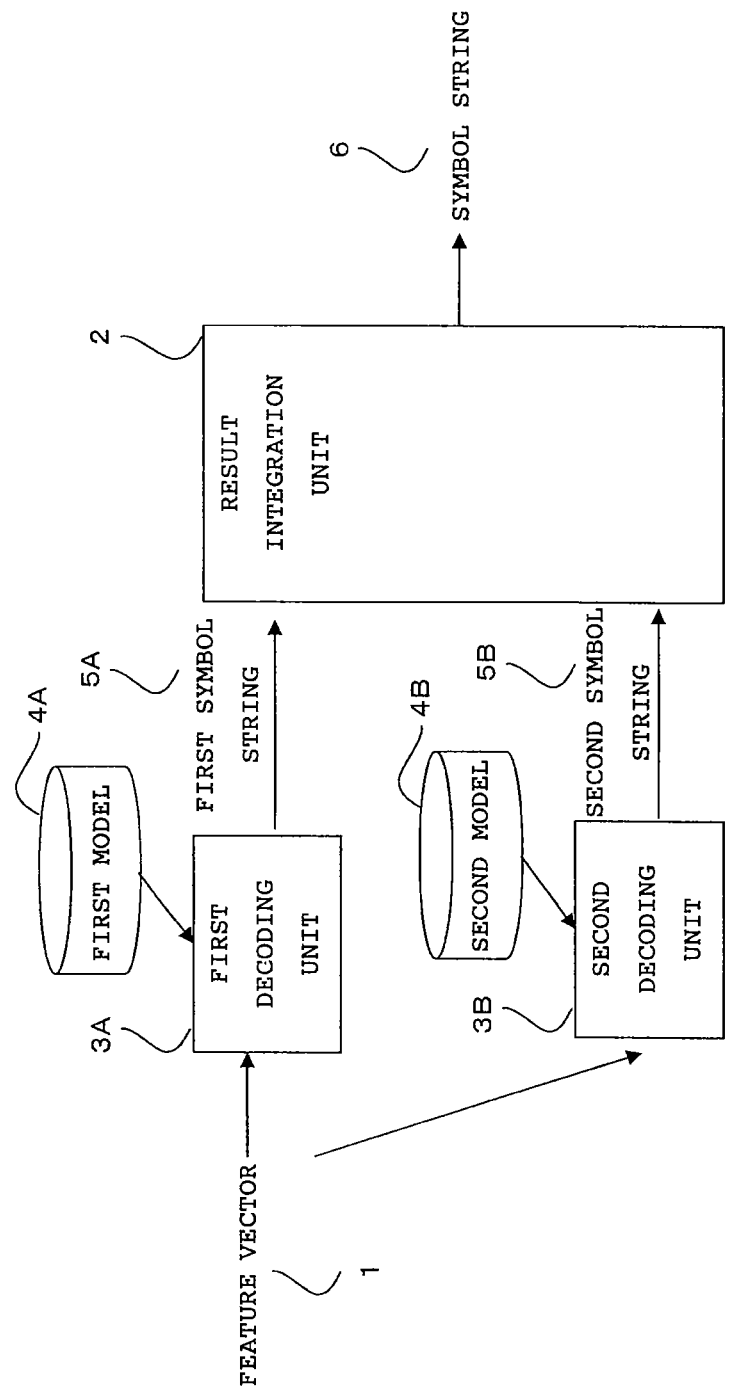
FIG. 1 is a block configuration diagram illustrating a configuration of integration of multiple systems according to a conventional method.

First, a configuration of integration of multiple systems according to a conventional method is illustrated in FIG. 1. In FIG. 1, decoding units 3 (first decoding unit 3A and second decoding unit 3B) obtain symbol strings 5 (first symbol string 5A and second symbol string 5B) from a feature vector 1 by checking against models 4 (first model 4A and second model 4B). A combination of two systems is described here, but any number of two or more systems can be used.

The symbol strings 5 (first symbol string 5A and second symbol string 5B) obtained by the multiple decoding units 3 are integrated by a result integration unit 2 to obtain a symbol string 6. At this time, a result integration method such as the above-mentioned ROVER can be utilized.

A problem with this method is that, in training the models 4, because the symbol strings 5 do not have mutually different tendencies, it is difficult to find an optimal combination. Moreover, in order to find the optimal combination, a large number of systems need to be created and trials and errors are made, and further, when the number of systems is increased, the number of combinations is increased significantly, with the result that the trials and errors become very time consuming.

As described above, the conventional method has the problem in that the systems have not been constructed with the assumption that recognition results thereof should have mutually different tendencies. In order to improve recognition performance in system integration, the following two points are required.

Condition 1: Output tendencies of the systems are mutually different (this is because combination effects are small when the systems give similar hypotheses).

Condition 2: The systems individually have a similar level of recognition performance (the systems to be combined do not include one having too low recognition performance).

In order to satisfy those conditions, in a first embodiment of the present invention, the systems are constructed sequentially. To be specific, a system is first constructed by a general method, and the next system is constructed so as to have a different output tendency by adjusting model parameters while considering an output tendency of the system that is constructed first, and not to have too low recognition performance by referring to correct labels in a discriminative training framework.

Figure 2:
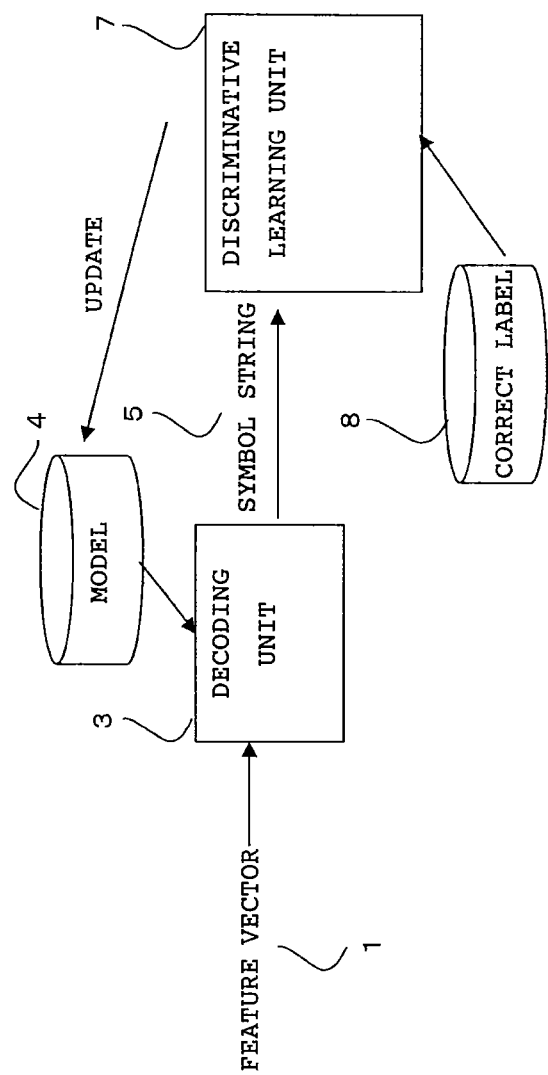
FIG. 2 is a block configuration diagram illustrating a configuration of model update according to the conventional method.
Figure 3:
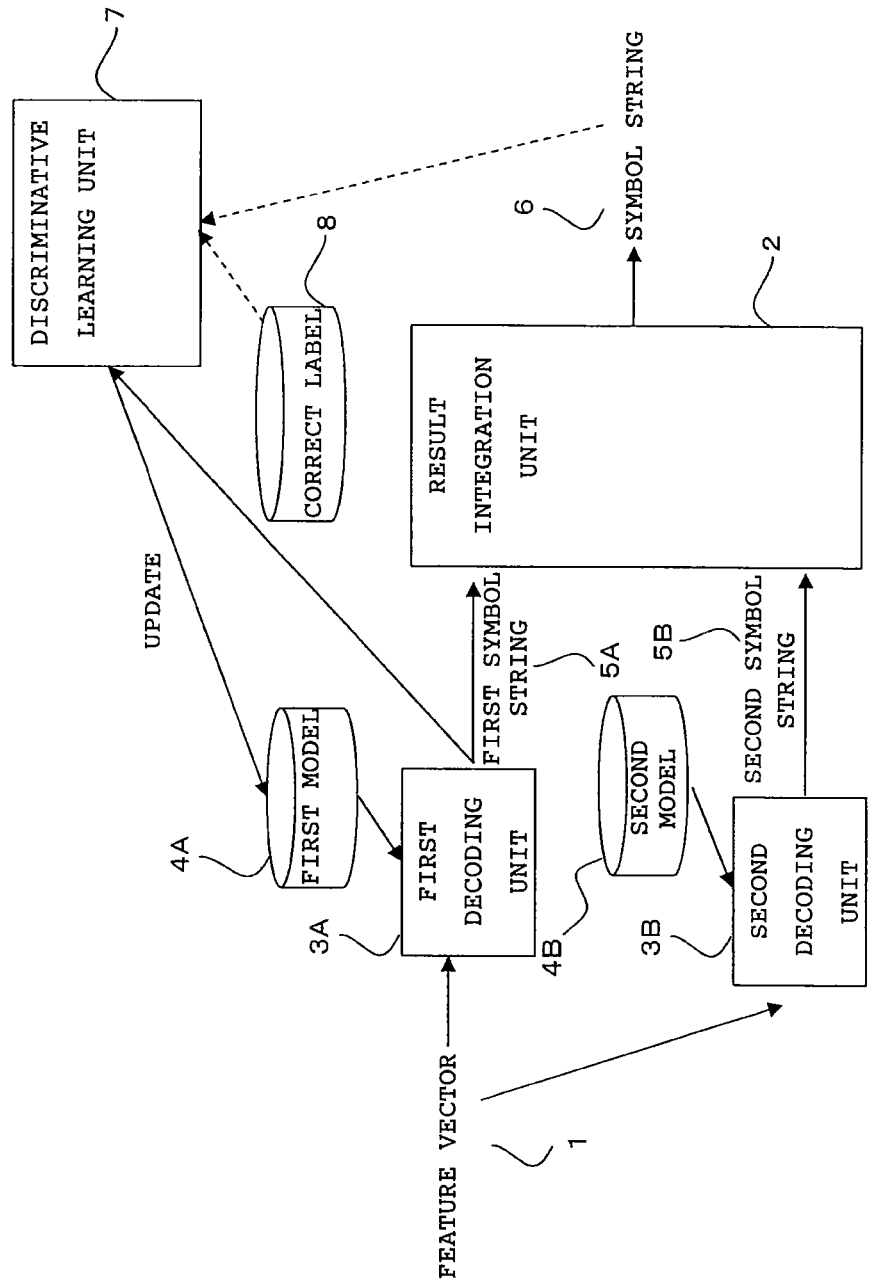
FIG. 3 is a block configuration diagram illustrating an entire system according to the conventional method.

Next, a configuration of model update according to the conventional method is illustrated in FIG. 2. In FIG. 2, in updating a model, a discriminative training unit 7 is used instead of the result integration unit 2 illustrated in FIG. 1 to update the model parameters from the feature vectors based on correct labels 8 by the discriminative training. An entire system in which FIGS. 1 and 2 are combined according to the conventional method is illustrated in FIG. 3.

This model can be updated in advance, but the parameters of this model can be updated on-line from a log of the symbol strings 6, which are the recognition results, with ones having the highest likelihood or reliability being treated as the correct labels 8. In other words, the correct labels 8 can be replaced by the symbol strings 6.

In the conventional method, the model 4 is updated based on the output symbol string 5 of one model by the discriminative training unit 7. In contrast, in the first embodiment of the present invention, model update is executed with a configuration illustrated in FIG. 4.

Figure 4:
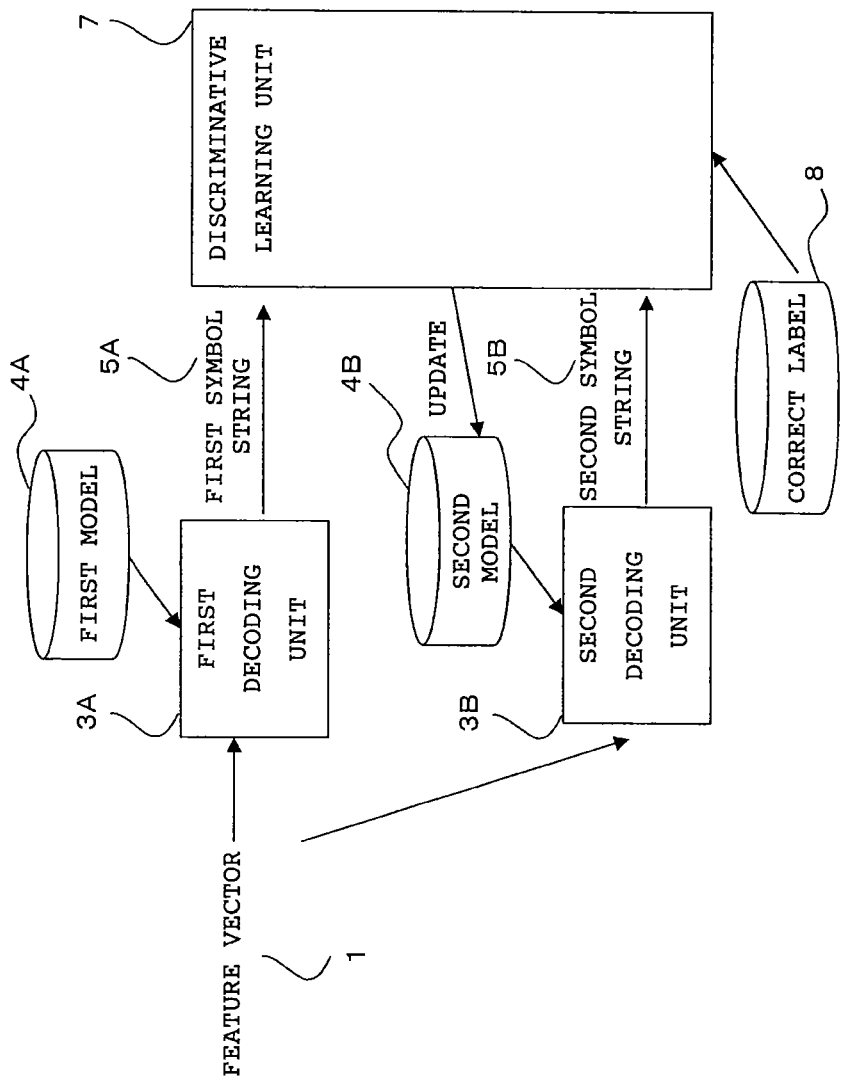
FIG. 4 is a block configuration diagram illustrating a configuration of model update in a pattern recognition apparatus according to a first embodiment of the present invention.

The configuration of the model update according to the first embodiment of the present invention, which is illustrated in FIG. 4, is different from FIG. 2 in that, in the discriminative training unit 7, the model update is executed while referring to the output of the other system (in this example, first symbol string 5A). Note that, the following embodiments omit figures of the model update by the conventional method, but each of the following embodiments and the conventional method are different in whether or not the symbol string of the other system is referred to.

In FIG. 4, the first model 4A is trained as usual by a maximum likelihood estimation method or a discriminative training method referring to the correct labels 8. At this time, model parameters of the second model 4B are updated referring to the second symbol string 5B and the correct labels 8 while also taking the first symbol string 5A into consideration, with the result that the second model 4B having a different output tendency from that of the first model 4A can be constructed.

In the general discriminative training, in order to improve the recognition performance, the model parameters are updated so as to compensate for the difference between statistics based on the aligned correct labels 8 and statistics based on the recognition results of the base model.

In contrast, in the first embodiment of the present invention, the model parameters are updated so as to compensate for the difference between the statistics based on the aligned correct labels 8 and the statistics based on the recognition results of the base model, the difference between the statistics based on the aligned correct labels 8 and statistics based on the aligned first symbol string 5A, and a sum of the differences.

In this manner, the model parameters are updated so that the output hypotheses departs from the first symbol string 5A, and the above-mentioned condition 1 is satisfied. Also at this time, the correct labels 8 are included as a reference to avoid a reduction in performance of the second model 4B, and the above-mentioned condition 2 is satisfied.

Now, a specific description is given by taking as an example the discriminative training of an acoustic model in speech recognition. First, an objective function F for updating the parameters of an acoustic model in maximization of mutual information is expressed as Equation (1) below.

$$\mathcal{F}(\lambda) = \ln \frac{P_\lambda(s_r, x_t)}{\sum_s P_\lambda(s, x_t)} = \ln \frac{p_\lambda(x_t|\mathcal{H}_{s_r})^\kappa p_L(s_r)}{\sum_s p_\lambda(x_t|\mathcal{H}_s)^\kappa p_L(s)} \quad (1)$$

In Equation (1), $\lambda$ represents an acoustic model parameter, and $x_t$ represents a feature vector string of the t-th frame. Moreover, a product of an acoustic model likelihood $p_\lambda$ (scale $\kappa$) and a language model likelihood $p_L$ is represented by $P_\lambda$. We omit the product over t in the acoustic model likelihood for simplicity, and the summation over s is performed for all possible symbol string in this sense. Note that, the acoustic model likelihood is conditioned by strings $H_{s_r}$ and $H_s$ of a hidden Markov model (HMM). Moreover, a correct label is represented by $s_r$, and a symbol string is represented by s.

If a Gaussian mixture model (GMM) is used as the emission probability of the HMM in the acoustic model, a specific update expression for an average $\mu'$ and a variance $\Sigma'$ of the model parameters is expressed by Equation (2) below.

$$\mu'_{jm} = \frac{\sum_t \Delta_{jm,t} x_t + D_{jm} \mu_{jm}}{\sum_t \Delta_{jm,t} + D_{jm}}, \quad (2)$$

$$\Sigma'_{jm} = \frac{\sum_t \Delta_{jm,t} x_t x_t^T + D_{jm}(\Sigma_{jm} + U_{jm})}{\sum_t \Delta_{jm,t} + D_{jm}} - U'_{jm}$$

In Equation (2), Gaussian mean and covariance parameters of an original model are represented by $\mu$ and $\Sigma$, respectively. Moreover, a state index of the HMM is represented by j, and an index of the Gaussian mixture component is represented by m.

In addition, in Equation (2), $\Delta_{jm}$ is $\gamma_{jm,t}^{num} - \gamma_{jm,t}^{den}$, and $\gamma_{jm,t}^{num}$ and $\gamma_{jm,t}^{den}$ are posterior probabilities of the mixture component m in HMM state j at the frame t are computed from the numerator and the denominator of Equation (1), respectively. $D_{jm}$ is a parameter for adjusting the covariance parameter so as not to be negative. Moreover, $U_{jm} = \mu \mu^T$ and $U'_{jm} = \mu' \mu'^T$, and T represents transposition.

Meanwhile, the specific algorithm executed by the discriminative training unit 7 illustrated in FIG. 2 is expressed as follows.

---

Algorithm 1 Construct MMI or bMMI model

---

Input: ML model mdl, mimerator ($s_r$ aligned) lattice $\mathcal{A}$, and denominator lattice $\mathcal{L}$ of Eq. (1) or (2)
   for i = 1 to $i_{eb}$ do
      Rescore $\mathcal{A}$ and $\mathcal{L}$ with mdl
      $\gamma_{jm,t}^{num}$ and $\gamma_{jm,t}^{den}$ ⇐ posteriors of $\mathcal{A}$ and $\mathcal{L}$, respectively
      $\gamma_{jm,t}$ ⇐ $-\gamma_{jm,t}^{den} + \gamma_{jm,t}^{num}$
      $\gamma_{jm,t}^{num}, \gamma_{jm,t}^{den}$ ⇐ positive and negative parts of $\gamma_{jm,t}$
      mdl ⇐ Update $\mu, \Sigma$ by Eq. (3).
   end for
Output: MMI or bMMI model (mdl)

---

Figure 5:
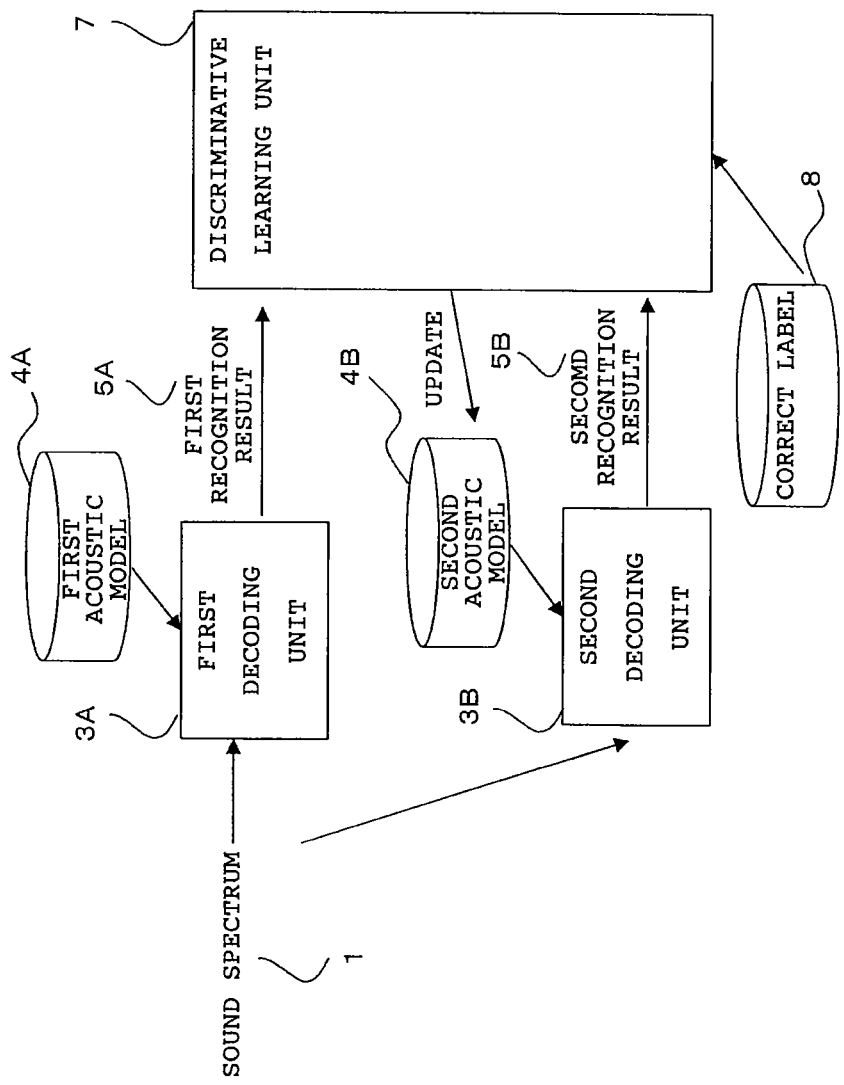
FIG. 5 is a block configuration diagram illustrating a configuration of model update for speech recognition in the pattern recognition apparatus according to the first embodiment of the present invention.

In contrast, the discriminative training unit 7 illustrated in FIG. 4 optimizes the second acoustic model 4B ($\lambda_c$) so as to maximize an objective function expressed by Equation (3) with respect to Q base systems constructed by the above-mentioned method. A specific configuration of model update for the speech recognition is illustrated in FIG. 5.

$$\mathcal{F}_c(\lambda_c) = \underbrace{\ln\left(\frac{P_{\lambda_c}(s_r, x_t)}{\sum_s P_{\lambda_c}(s, x_t)}\right)^{1+\alpha}}_{\text{MI to the correct labels}} - \sum_{q=1}^{Q} \underbrace{\ln\left(\frac{P_{\lambda_c}(s_{q,1}, x_t)}{\sum_s P_{\lambda_c}(s, x_t)}\right)^{\frac{\alpha}{Q}}}_{\text{MI to the 1-best}(q^{th} \text{ base system})} \quad (3)$$

Again, we omit the product over t in the acoustic model likelihood for simplicity, and the summation over s is performed for all possible symbol string in this sense. Equation (3) shows that the training proceeds to make the output results of the complimentary systems depart from the output results of the base systems by using the negative-signed mutual information with the base systems in addition to the mutual information with the correct labels, which is used in the general discriminative training.

In Equation (3), $\alpha$ is a parameter for adjusting the weight. As the value of $\alpha$ becomes larger, a more different output tendency from that of the original systems is exhibited, but at the same time, the output results depart from the correct ones to reduce the recognition accuracy. Therefore, the value of $\alpha$ needs to be adjusted. Moreover, $s_{q,1}$ is the 1-best result of the q-th base system.

Moreover, variables shown in Equation (4) below are substituted into Equation (2) above to form a specific update expression for the model parameters. For simplicity, the number of base systems is assumed here to be one. In Equation (4), $\gamma_{jm,t}^1$ represents a posterior probability given the mixture component m in HMM state j at the frame t with respect to the 1-best of the base system.

$$\Delta_{jm,t} \leftarrow (1-\alpha)\gamma_{jm,t}^{num} - (\gamma_{jm,t}^{den} + \alpha\gamma_{jm,t}^1), \quad (4)$$

$$\gamma_{jm,t}^{num} \leftarrow \gamma_{jm,t}^{num}$$

$$\gamma_{jm,t}^{den} \leftarrow \frac{1 + \alpha\frac{\gamma_{jm,t}^1}{\gamma_{jm,t}^{den}}}{1+\alpha} \gamma_{jm,t}^{den} = w_{jm,t}\gamma_{jm,t}^{den}$$

$$D_{jm} \leftarrow \frac{D_{jm}}{1+\alpha}.$$

The specific algorithm executed by the discriminative training unit 7 illustrated in FIG. 4 is expressed as follows.

---
Algorithm 2 Construct complementary system model
---

Input: ML model mdl, base system models $mdl_q$, numerator
 ($s_r$ aligned) lattice $\mathcal{A}$, and denominator lattice $\mathcal{L}$ of Eq. (1)
 or (2)
 for i = 1 to $i_{eb}$ do
  Rescore $\mathcal{A}$ and $\mathcal{L}$ with mdl
  $\gamma_{jm,t}^{num}$ and $\gamma_{jm,t}^{den} \Leftarrow$ posteriors of $\mathcal{A}$ and $\mathcal{L}$, respectively
  $\gamma_{jm,t} \Leftarrow -\gamma_{jm,t}^{den} + (1 + \alpha)\gamma_{jm,t}^{num}$
  for q = 1 to Q do
   Rescore $\mathcal{L}$ with $mdl_q$
   $\mathcal{L}_1 \Leftarrow$ best path of $\mathcal{L}$
   Rescore $\mathcal{L}_1$ with mdl
   $\gamma_{jm,t}^1 \Leftarrow$ posterior of $\mathcal{L}_1$ $$\gamma_{jm,t} \Leftarrow -\frac{\alpha}{Q}\gamma_{jm,t}^1 + \gamma_{jm,t}$$

end for
  $\gamma_{jm,t}^{num}, \gamma_{jm,t}^{den} \Leftarrow$ positive and negative parts of $\gamma_{jm,t}$
  mdl $\Leftarrow$ Update $\mu$, $\Sigma$ by Eq. (3) with Eq. (8).
 end for
Output: Complementary system model (mdl)

---

As described above, in updating the models by the discriminative training unit 7, the model 4 having a different tendency from that of the original system can be constructed by referring to the recognition results obtained by the original system. At this time, the high recognition performance of the newly created system can also be kept by referring also to the correct labels 8.

The case of two systems has been described above as an example, but the same holds true for three or more systems. As with the formulation described above, the method in which the output tendencies of the first model and the second model are referred to in constructing the model 4, and the method in which only the output tendency of the second model is referred to in constructing the model 4 can be contemplated.

As described above, the first embodiment is aimed at improving the recognition performance by creating multiple systems and combining the multiple systems, and includes the discriminative training unit (step) in which, in creating the second or subsequent system, the model parameters are constructed based on the output tendencies of the previously-constructed models so as to be different from the output tendencies of the previously-constructed models.

Therefore, when the multiple systems are combined, the recognition performance can be improved.

Note that, the effects of the first embodiment of the present invention can be obtained also in the following embodiments.

Second Embodiment

Reconstruction of the original system using the recognition results obtained as a result of the model update In the first embodiment described above, the second model 4B is updated using the first symbol string 5A of the base system, but it can also be contemplated to re-update the first model 4A by using the second model 4B obtained as a result of the update.

As a specific method, the method of the first embodiment described above can be used directly. When the model update is iterated by this method, the output tendencies of the first model and the second model depart from each other by iteration by iteration. Therefore, after a sufficient number of iterations, hypotheses having different tendencies can be obtained from the two models.

Third Embodiment

Construction method of the complementary system based on recognition rate maximization of an integration result In the first embodiment described above, the second model 4B is constructed so that the recognition results have a different tendency from those of the first model 4A. In a third embodiment of the present invention, the second model 4B is constructed so as to maximize the recognition rate by further using an integration result of the result integration unit 2.

In general, when training data is changed, the output tendency is changed significantly. In the third embodiment of the present invention, as in the first embodiment, the first model 4A is trained by a general method. In contrast, in training the second model 4B, the training data is divided into several pieces (for example, N pieces) by a training data dividing unit (which is to be described later) to create the models.

Figure 6:
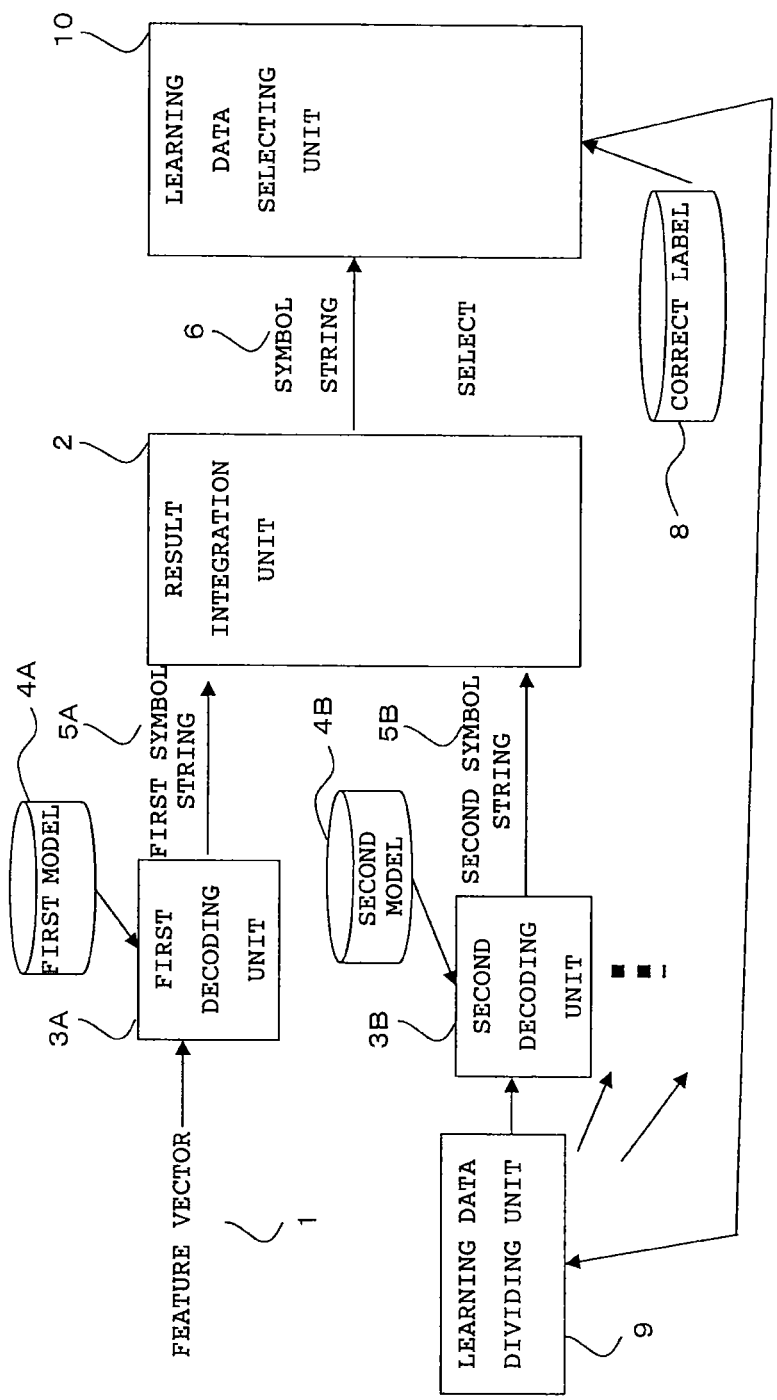
FIG. 6 is a block configuration diagram illustrating a configuration of construction of a complementary system based on recognition rate maximization of an integration result in a pattern recognition apparatus according to a third embodiment of the present invention.

A configuration of construction of the complementary system based on the recognition rate maximization of the integration result according to the third embodiment of the present invention is illustrated in FIG. 6. In FIG. 6, a training data dividing unit 9 for dividing the training data, and a training data selecting unit 10 for selecting appropriate training data referring to the correct labels 8 are provided.

The training data dividing unit 9 generates N models ($1 \leq n \leq N$). Further, of those pieces of training data, the training data having the highest recognition rate is selected by the training data selecting unit 10. Note that, the training data selecting unit 10 may select up to M pieces of training data having the highest recognition rates.

In this case, the second model 4B is re-trained based on the selected training data to construct the model 4 having a different output tendency from that of the first model 4A by means of the selection of the training data (the condition 1 is satisfied), and at the same time, the recognition performance of the system can be secured (the condition 2 can be satisfied).

Fourth Embodiment

Combination with a Reranking Method

In the first embodiment described above, the case where two or more decoding units 3 are provided has been described, but even when only one decoding unit 3 is provided, the recognition results thereof can be used to output multiple candidates.

Figure 7:
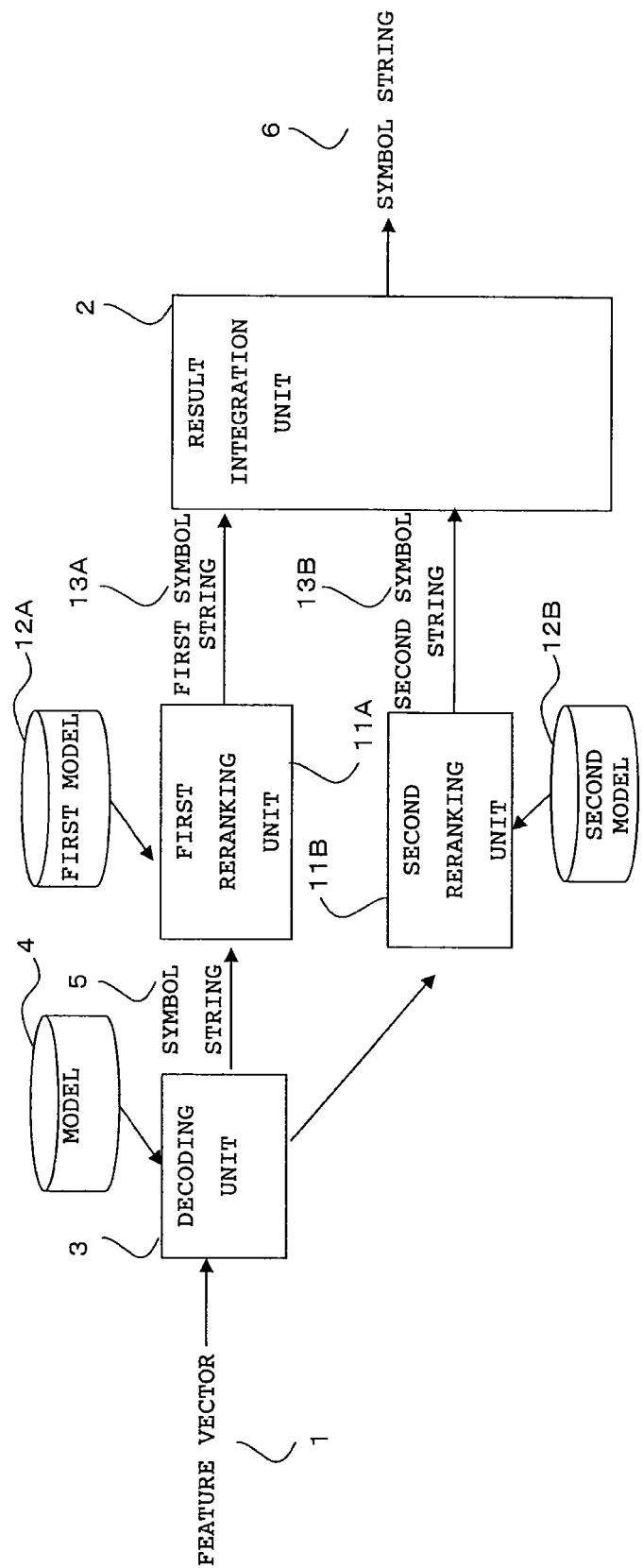
FIG. 7 is a block configuration diagram illustrating a configuration of a reranking method according to the conventional method.

For example, a reranking unit for reordering N-best result lists can be used. A configuration of a reranking method according to the conventional method is illustrated in FIG. 7. In FIG. 7, as compared to the configuration illustrated in FIG. 2, reranking units 11 (first reranking unit 11A and second reranking unit 11B) and models 12 (first model 12A and second model 12B) are added. The N-best lists reordered by the reranking units 11 are symbol strings 13 (first symbol string 13A and second symbol string 13B).

Figure 8:
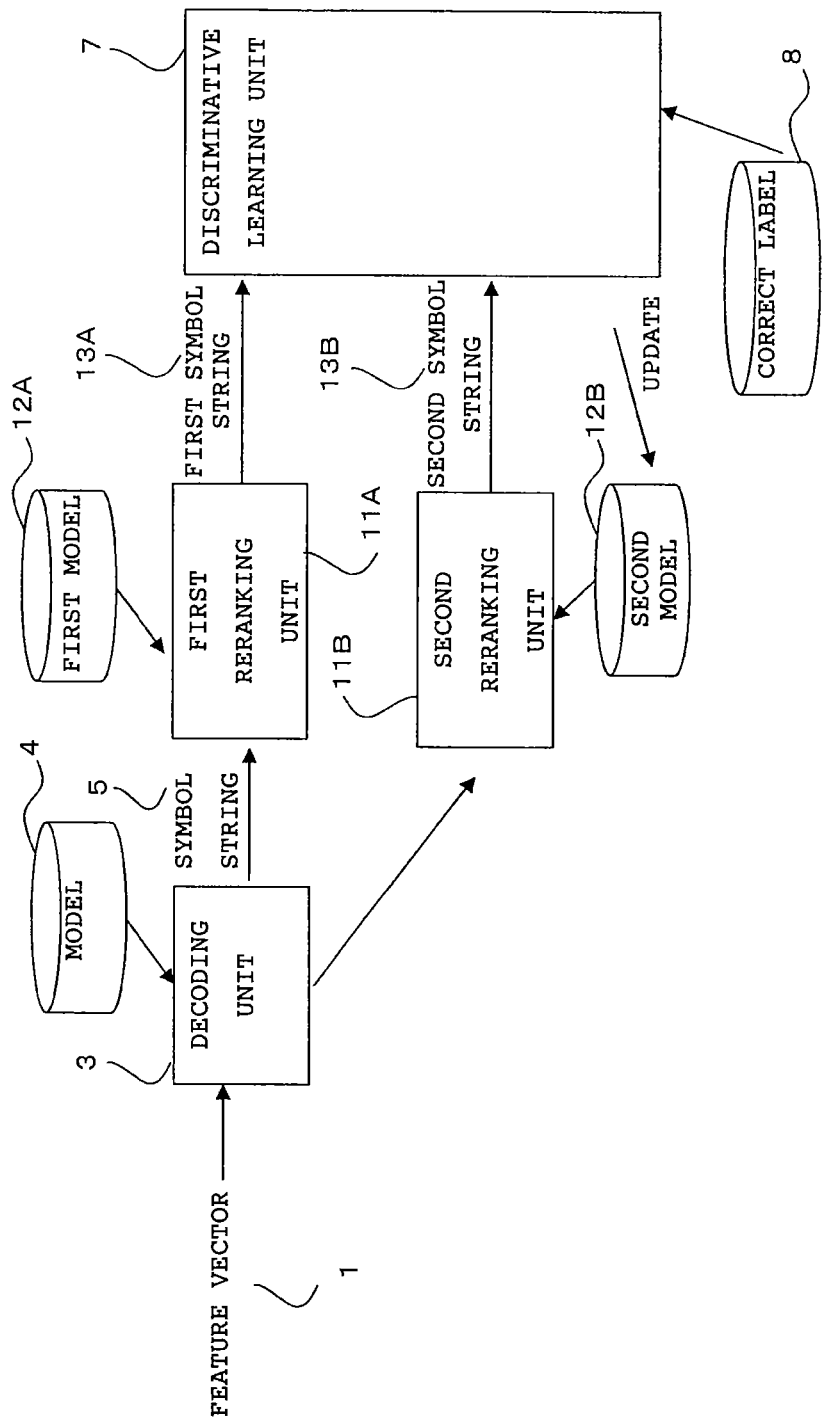
FIG. 8 is a block configuration diagram illustrating a configuration of model update using a reranking method in a pattern recognition apparatus according to a fourth embodiment of the present invention.

In a fourth embodiment of the present invention, as illustrated in FIG. 8, the second model 12B is updated so that the second reranking unit 11B can output a recognition result (second symbol string 13B) that is as different as possible.

Figure 9:
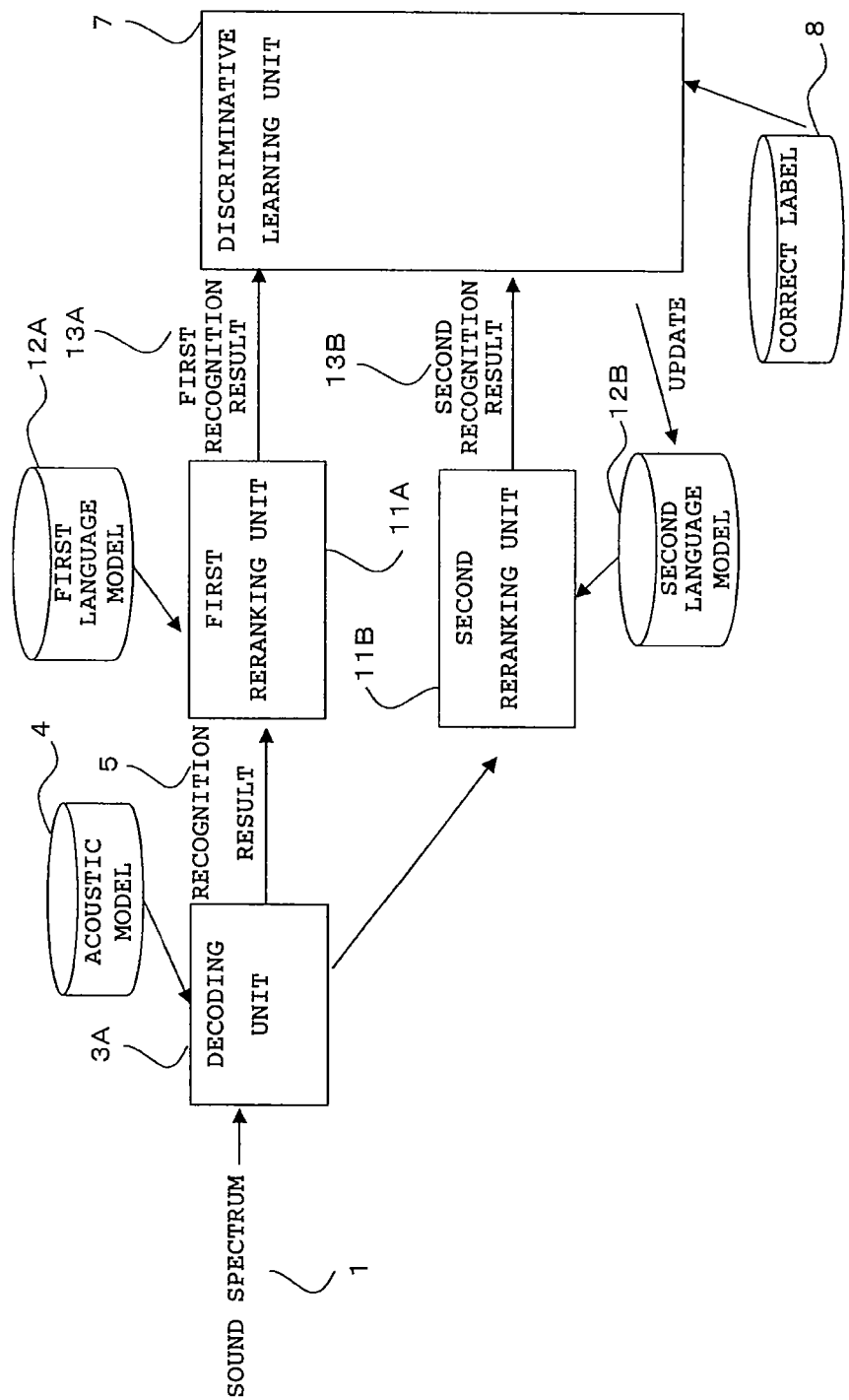
FIG. 9 is a block configuration diagram illustrating a configuration of model update for speech recognition in the pattern recognition apparatus according to the fourth embodiment of the present invention.

Here, as the reranking units 11, for example, there may be used a discriminative language model (B. Roark, M. Saraclar, M. Collins, and M. Johnson, "Discriminative language modeling with conditional random fields and the perceptron algorithm," in Proc. ACL, 2004, pp. 47-54). A specific configuration of model update for speech recognition is illustrated in FIG. 9.

In the discriminative language model, in units of n-grams, the model (language model) 12 of a weight vector w obtained by subtracting the number of n-gram counts that appear in the recognition results (symbol strings) 13 from the number of n-gram counts that appear in the correct labels 8 is used to reorder a first recognition result (first symbol string) 13A and thereby obtain a better recognition result.

To be specific, the dimension of the weight vector w is the total number N of n-gram entries, and w(1), ..., w(N) each represent the number of corresponding n-gram counts that appear in character strings. In general, the discriminative training unit 7 counts $w_c$ from the correct answers, and then counts $w_r$ that appear in the recognition results. Then, the weight vector w is expressed as $w=w_c-w_r$, and then scaled by a factor, which is set by empirically by checking the performance of a development set.

According to the fourth embodiment of the present invention, when the count of the first recognition result (first symbol string) 13A is represented by $w_{r1}$ and the count of the second recognition result (second symbol string) 13B is represented by $w_{r2}$, the second language model 12B is represented by $w_2=w_c-a_1w_{r1}-a_2w_{r2}$. Note that, $a_1$ and $a_2$ are weights, and when the first recognition result 13A and the second recognition result 13B are placed the same level of importance, $a_1=a_2=0.5$ holds.

Fifth Embodiment

Combination with a Feature Transformation Method

In the first embodiment described above, the symbol strings 5 are obtained from the feature vector 1 by checking against the models 4 in the decoding units 3, but when feature transformation is performed before the decoding, the recognition performance can be improved.

Figure 10:
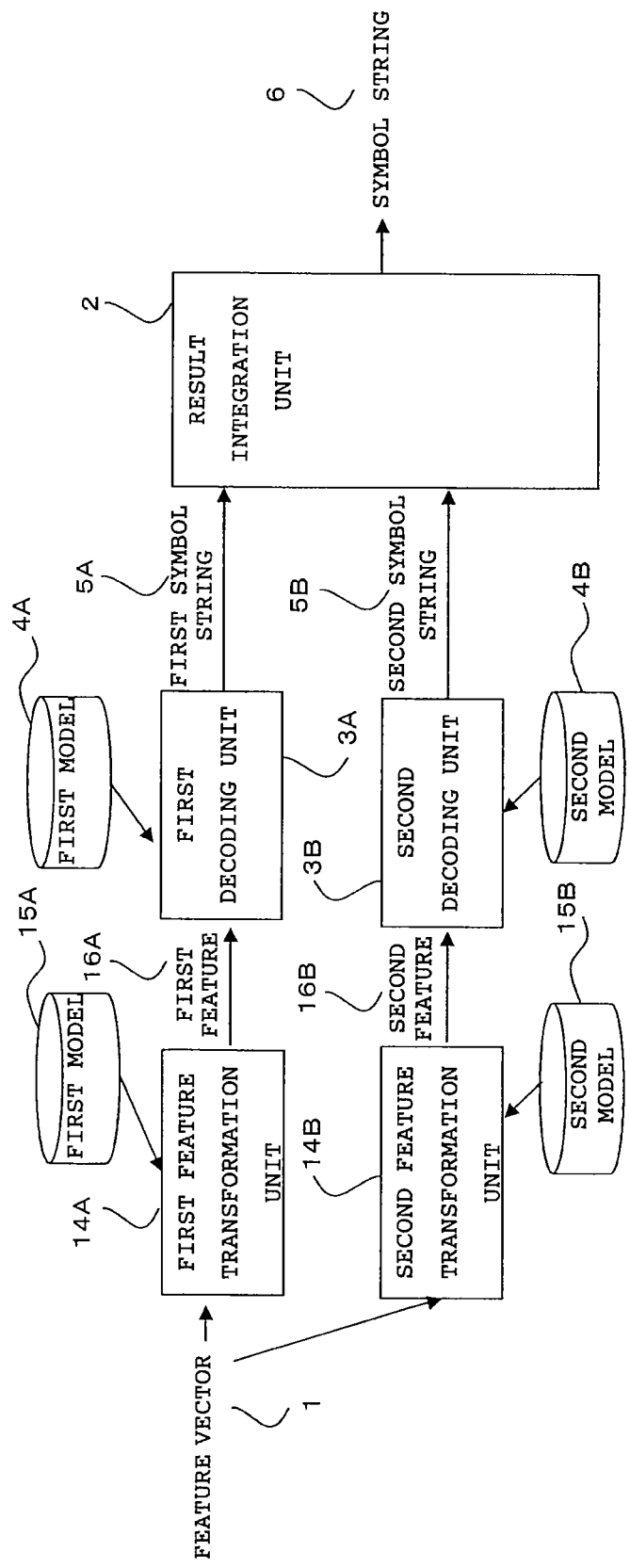
FIG. 10 is a block configuration diagram illustrating a configuration of a feature transformation method according to the conventional method.

A configuration of a feature transformation method according to the conventional method is illustrated in FIG. 10. In FIG. 10, when feature transformation models 15 (first feature transformation model 15A and second feature transformation model 15B) are trained in advance, transformed features 16 (first feature 16A and second feature 16B) obtained by the feature transformation units 14 (first feature transformation unit 14A and second feature transformation unit 14B), can be used to obtain the symbol string 6.

Figure 11:
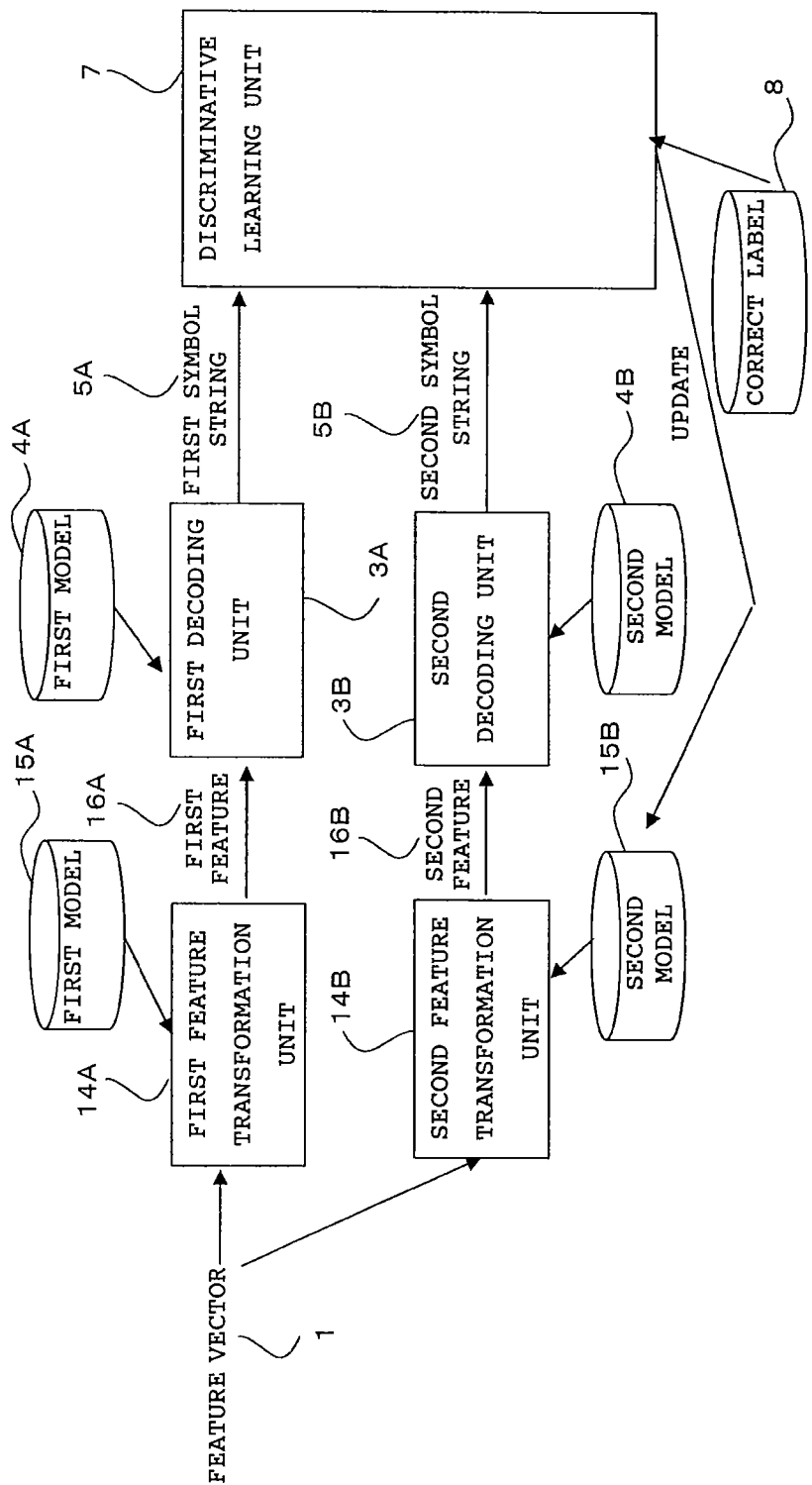
FIG. 11 is a block configuration diagram illustrating a configuration of model update using a feature transformation method in a pattern recognition apparatus according to a fifth embodiment of the present invention.

In contrast, a configuration according to a fifth embodiment of the present invention which introduces a framework of referring to the original system to update the second feature transformation model 15B is illustrated in FIG. 11. In FIG. 11, as in the first embodiment described above, the second feature transformation model 15B for use in the second feature transformation unit 14B can be updated based on the symbol strings 5, which are the recognition results, so that the symbol strings 5 have mutually different tendencies.

Here also, in regards to the speech recognition, for example, there can be used discriminative feature transformation (D. Povey, B. Kingsbury, L. Mangu, G. Saon, H. Soltau, and G. Zweig, "fMPE: Discriminatively trained features for speech recognition" in Proc. ICASSP, 2005, pp. 961-964).

In the discriminative feature transformation, the feature transformation models 15 (matrices M) are used to transform a feature x and a high-dimensional feature h, which is derived from x, into a feature y as expressed by Equation (5) below.

$$y=x+Mh \qquad (5)$$

In Equation (5), M is determined so as to optimize Equation (6) below, which is obtained by differentiating the objective function F of Equation (1) with respect to M, where we use y instead of x in Equation (1).

$$\frac{\partial \mathcal{F}}{\partial M} = \left[\frac{\partial \mathcal{F}}{y_1} \cdots \frac{\partial \mathcal{F}}{y_{T_f}}\right] [h_1 \ldots h_{T_f}]^T \qquad (6)$$

At this time, as in the first embodiment described above, the second feature transformation model 15B can be updated by referring not only to the second symbol string 5B but also to the first symbol string 5A.

Note that, any of the first to fifth embodiments described above can be combined. Further, in the first to fifth embodiments described above, specific description has been made taking the speech recognition as an example. However, the present invention is not limited thereto, and a similar configuration can be used also for character recognition by substituting the sound spectrum by an image feature and substituting the models (for example, models 4A and 4B of FIGS. 3 and 4) by an image model or a language model.

What is claimed is:

1. A pattern recognition apparatus that combines and constructs multiple systems to improve recognition performance, comprising:
   a first system having a first model and a first decoder, which outputs a recognition result of the first system, the recognition result of the first system having a first output tendency;
   a second system having a second model, a second decoder, and a feature transformer, the feature transformer being configured to transform a received feature vector, which is input externally, based on the second model, which has been trained in advance based on the recognition result of the first system, and the feature transformer transforms the feature vector to produce a transformed feature vector that is decoded by the second decoder to output a recognition result of the second system, the recognition result of the second system having a second output tendency;
   a discriminative training unit that constructs model parameters of the second model in the second system based on the first output tendency of the recognition result of the first system so the second output tendency of the recognition result of the second system is different from the first output tendency of the recognition result of the first system; and
   a recognizing unit that recognizes a speech pattern or a character pattern in the received feature vector based on the recognition result of the first system and the recognition result of the second system.

2. A pattern recognition apparatus according to claim 1, wherein in updating the model parameters, the discriminative training unit updates the model parameters based on an output result of a base system.

3. A pattern recognition apparatus according to claim 1, wherein in updating the model parameters, the discriminative training unit updates the model parameters based on an output result of a base system, updates the model parameters based on an output result of a system that is obtained as a result of the update, and iterates the updates.

4. A pattern recognition apparatus according to claim 1, further comprising:
   a training data dividing unit for dividing training data of a model into multiple sets of training data to obtain multiple models for the second or subsequent system; and
   a training data selecting unit for selecting, from among the multiple models obtained by the division in the training data dividing unit, one of training data having a highest recognition rate and pieces of training data which rank high in recognition rate,
   wherein the discriminative training unit re-trains the model based on the one of the training data and the pieces of training data selected by the training data selecting unit.

5. A pattern recognition apparatus according to claim 2, further comprising:
   a training data dividing unit for dividing training data of a model into multiple sets of training data to obtain multiple models for the second or subsequent system; and
   a training data selecting unit for selecting, from among the multiple models obtained by the division in the training data dividing unit, one of training data having a highest recognition rate and pieces of training data which rank high in recognition rate,
   wherein the discriminative training unit re-trains the model based on the one of the training data and the pieces of training data selected by the training data selecting unit.

6. A pattern recognition apparatus according to claim 3, further comprising:
   a training data dividing unit for dividing training data of a model into multiple sets of training data to obtain multiple models for the second or subsequent system; and
   a training data selecting unit for selecting, from among the multiple models obtained by the division in the training data dividing unit, one of training data having a highest recognition rate and pieces of training data which rank high in recognition rate,
   wherein the discriminative training unit re-trains the model based on the one of the training data and the pieces of training data selected by the training data selecting unit.

7. A pattern recognition apparatus according to claim 1, further comprising a reranking unit for reordering, by using multiple models having different output tendencies, N-best result lists obtained after a feature vector, which is input externally, is decoded by a decoding unit.

8. A pattern recognition apparatus according to claim 2, further comprising a reranking unit for reordering, by using multiple models having different output tendencies, N-best result lists obtained after a feature vector, which is input externally, is decoded by a decoding unit.

9. A pattern recognition apparatus according to claim 3, further comprising a reranking unit for reordering, by using multiple models having different output tendencies, N-best result lists obtained after a feature vector, which is input externally, is decoded by a decoding unit.

10. The pattern recognition apparatus according to claim 1, wherein the received feature vector includes a received sound spectrum or a received image feature, and the first and second models each include an image model or a language model.

11. A pattern recognition method to be used in a pattern recognition apparatus that constructs and combines multiple systems to improve recognition performance, the pattern recognition method comprising:
   constructing a first system having a first model;
   receiving a feature vector from an external source;
   transforming and decoding the received feature vector based on the first model to output a recognition result of the first system, the recognition result of the first system having a first output tendency;
   constructing model parameters of a second model in a second system based on the first output tendency of the recognition result of the first system so a second output tendency of a recognition result of the second system is different from the first output tendency of the recognition result of the first system;
   transforming the received feature vector based on the second model, which has been trained in advance based on the recognition result of the first system to produce a transformed feature vector;
   decoding the transformed feature vector to output the recognition result of the second system; and
   recognizing a speech pattern or a character pattern in the received feature vector based on the recognition result of the first system and the recognition result of the second system.

12. The pattern recognition method according to claim 11, wherein the received feature vector includes a received sound spectrum or a received image feature, and the first and second models each include an image model or a language model.

* * * * *